United States Patent
Wanke

(10) Patent No.: US 7,172,255 B2
(45) Date of Patent: Feb. 6, 2007

(54) VEHICLE SEAT

(75) Inventor: Jürgen Wanke, Nürnberg (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 11/213,738

(22) Filed: Aug. 30, 2005

(65) Prior Publication Data

US 2006/0055224 A1    Mar. 16, 2006

(30) Foreign Application Priority Data

Aug. 31, 2004  (DE) .................. 10 2004 042 040

(51) Int. Cl.
    A47C 7/36    (2006.01)
(52) U.S. Cl. .............. 297/410; 297/391; 297/397; 297/61
(58) Field of Classification Search ............. 297/410, 297/391, 61, 397
    See application file for complete search history.

(56) References Cited

U.S. PATENT DOCUMENTS

| | | | |
|---|---|---|---|
| 5,156,440 A * | 10/1992 | Vidwans .................. | 297/410 |
| 5,860,703 A * | 1/1999 | Courtois et al. ........... | 297/410 |
| 5,934,755 A * | 8/1999 | Halamish .................. | 297/410 |
| 5,997,090 A | 12/1999 | Baloche et al. | |
| 6,260,924 B1 | 7/2001 | Jones et al. | |
| 6,290,299 B1 * | 9/2001 | Frisch et al. ............... | 297/410 |
| 6,364,415 B1 * | 4/2002 | Mori et al. ................ | 297/410 |
| 6,460,931 B2 * | 10/2002 | Beck ........................ | 297/410 |
| 6,742,846 B1 * | 6/2004 | Isaacson .................. | 297/410 |
| 6,874,854 B2 * | 4/2005 | Terrand et al. ............ | 297/410 |
| 6,969,118 B2 * | 11/2005 | Yamada ................... | 297/410 |
| 7,044,556 B1 * | 5/2006 | Yetukuri et al. ........... | 297/410 |

FOREIGN PATENT DOCUMENTS

DE    G 90 11 486.8    11/1990

(Continued)

OTHER PUBLICATIONS

German Patent Office Action dated Mar. 22, 2005 in German Application No. 10 2004 049 191.7-74, filed Oct. 8, 2004 (2 pages).

(Continued)

*Primary Examiner*—Peter M. Cuomo
*Assistant Examiner*—Erika Garrett
(74) *Attorney, Agent, or Firm*—Shlesinger, Arkwright & Garvey LLP

(57) ABSTRACT

Vehicle seat includes a seat portion and a backrest having a height-adjustable headrest. To facilitate the height adjustment of the headrest, two retaining rods are fit into nonreclining sleeves, and have spaced apart arresting notches on a lower portion of the retaining rods. The headrest can be set at any height by use of a locking mechanism on the upper surface of the backrest. The locking mechanism includes a base nonrotably secured to the backrest that includes a base portion and a spaced apart covering portion. The base portion and covering portion are connected via a central pillar to form one piece. The locking mechanism includes a spring with an arresting arm and a retaining arm configured to be mated with respective walls of the column, and biased by a bulge on the column. A cover ring having engaging elements engages the base, and may have spaced apart engaging fingers.

9 Claims, 2 Drawing Sheets

FOREIGN PATENT DOCUMENTS

| | | |
|---|---|---|
| DE | 42 01 829 A1 | 6/1993 |
| DE | 44 00 911 A1 | 8/1994 |
| DE | 44 44 122 C1 | 4/1996 |
| DE | 196 35 740 A1 | 3/1997 |
| DE | 196 00 789 C2 | 7/1997 |
| DE | 297 07 562 U1 | 10/1997 |
| DE | 42 16 584 C2 | 7/1998 |
| DE | 197 24 554 A1 | 12/1998 |
| DE | 197 13 753 C2 | 2/2000 |
| DE | 198 82 413 T1 | 5/2000 |
| DE | 698 00 455 T2 | 6/2001 |
| DE | 100 26 530 A1 | 12/2001 |
| DE | 101 42 981 A1 | 3/2003 |
| DE | 101 60 929 A1 | 7/2003 |
| DE | 102 30 637 A1 | 1/2004 |
| DE | 103 01 283 B3 | 1/2004 |
| DE | 102 40 042 A1 | 11/2004 |
| DE | 103 15 375 A1 | 11/2004 |
| EP | 0 901 934 A1 | 3/1999 |
| EP | 1 046 541 A1 | 10/2000 |
| JP | 10147166 A | 6/1998 |
| JP | 2001097099 A | 4/2001 |
| WO | 99/38723 | 8/1999 |
| WO | 01/89875 A1 | 11/2001 |

OTHER PUBLICATIONS

German Office Action dated Oct. 24, 2005 in German Application No. 10 2005 003 819.0-16, filed Jan. 27, 2005 (2 pages).

German Office Action dated Mar. 10, 2005 in German Application No. 10 2004 045 988.6-42, filed, Sep. 22, 2004 (3 pages).

German Office Action dated Dec. 6, 2005 in German Application No. 10 2005 005 485.4, filed Feb. 4, 2005 (3 pages).

\* cited by examiner

VEHICLE SEAT

CROSS-REFERENCE TO RELATED APPLICATIONS

This application claims the priority of German application No. 10 2004 042 040.8, filed Aug. 31, 2004, which is incorporated herein by reference.

FIELD OF THE INVENTION

The invention relates to a vehicle seat. More particularly, the invention relates to a motor vehicle seat with a headrest mounted on the backrest with at least one retaining rod by which the headrest height can be adjusted. Even more particularly, the invention relates to a motor vehicle seat with an adjustable headrest mounted on the backrest with at least one retaining rod by which the headrest height can be adjusted, and to facilitate the unlocking of the retaining rod an arresting foot can be pivoted against the tension of the associated spring and out of engagement with the arresting notch, by use of a manual operation or control element, and the manual operation element may be a cover ring which can be sealed to the base and twisted thereupon and which features an engaging finger for the arresting foot of the spring.

BACKGROUND OF THE INVENTION

DE 297 07 562 U1 describes a motor vehicle seat in which the retaining rods of its headrest fit into a nonreclining sleeve and are vertically adjustable therein. The sleeve features a sleeve head with which it forms one piece in which a rectangular frame in the form of a drawer is inserted and mounted at right angles to the longitudinal axis of the retaining rod as an arresting means. This frame features a foot, which locks into engagement with any of the arresting notches of the retaining rod of the headrest. The locking of the frame is ensured by springs, which abut both the frame and the sleeve head. In an embodiment, the retaining rod, that is the headrest, is released by means of a manual control element, which presses the frame against the force of the spring out of its locked position to allow the height of the headrest to be adjusted. The retaining rod engages both the sleeve head as well as the locking frame and can be moved in axial relation thereto.

The locking frame is made of a synthetic material and, as an injection molded part, entails a relatively time-consuming manufacturing process. Furthermore, this height adjustment mechanism of the headrest of a motor vehicle seat from the prior art can still be further simplified, despite having an already simple design.

The height adjustment mechanism described EP 1 046 541 A1 represents just such a simplification. In this particular seat, the retaining rods of the headrest as well as portion below featuring arresting notches fit into a nonreclining socket. An arresting means is present, which is realized as a spring with a retaining foot and an arresting foot and is mounted on a nonreclining base integrated into the top surface of the backrest. The spring abuts the base with its retaining foot and, in locked position, rests with its arresting foot engaging an arresting notch of the retaining rod as a result of spring tension. The free end of the arresting foot projects from the base and features a manual operating button in the form of a bulge. For headrest height to be lowered, the manual operating button of the arresting foot must be pivoted to the side, whereby the arresting foot is freed from the arresting notch of the retaining rod with which it was engaged.

OBJECTS AND SUMMARY OF THE INVENTION

An object of the invention is to produce a motor vehicle seat of the type described above, which features a headrest with a very simple height adjustment mechanism, wherein assembly is more cost-effective than that of the prior art and an aesthetically pleasing manual control element for unlocking the headrest is featured.

The inventive locking mechanism for the retaining rod of a headrest of a motor vehicle seat comprises only three parts, namely the base, the spring and the manual control element. The reduced number of parts already simplifies the assembly and reduces manufacturing costs. Assembly is further simplified by the fact that the manual control element is realized as a cover ring, which can be engaged with and rotated on the base, wherein this cover ring features an engaging finger for the arresting foot of the spring. The unlocking of the headrest is realized simply by twisting or rotating the cover ring on the base. At the same time, the cover ring constitutes an aesthetically pleasing manual control element.

The number of parts found in the motor vehicle seat is reduced as a result of the base being realized as an integrated head of the nonreclining sleeve in which the retaining rod fits.

Advantageous embodiments of the invention are described as set forth throughout.

Relative terms such as left, right, up, down, are for convenience only and are not intended to be limiting.

BRIEF DESCRIPTION OF THE DRAWINGS

An embodiment of the invention is described in further detail below.

DETAILED DESCRIPTION OF THE INVENTION

Figure 1:
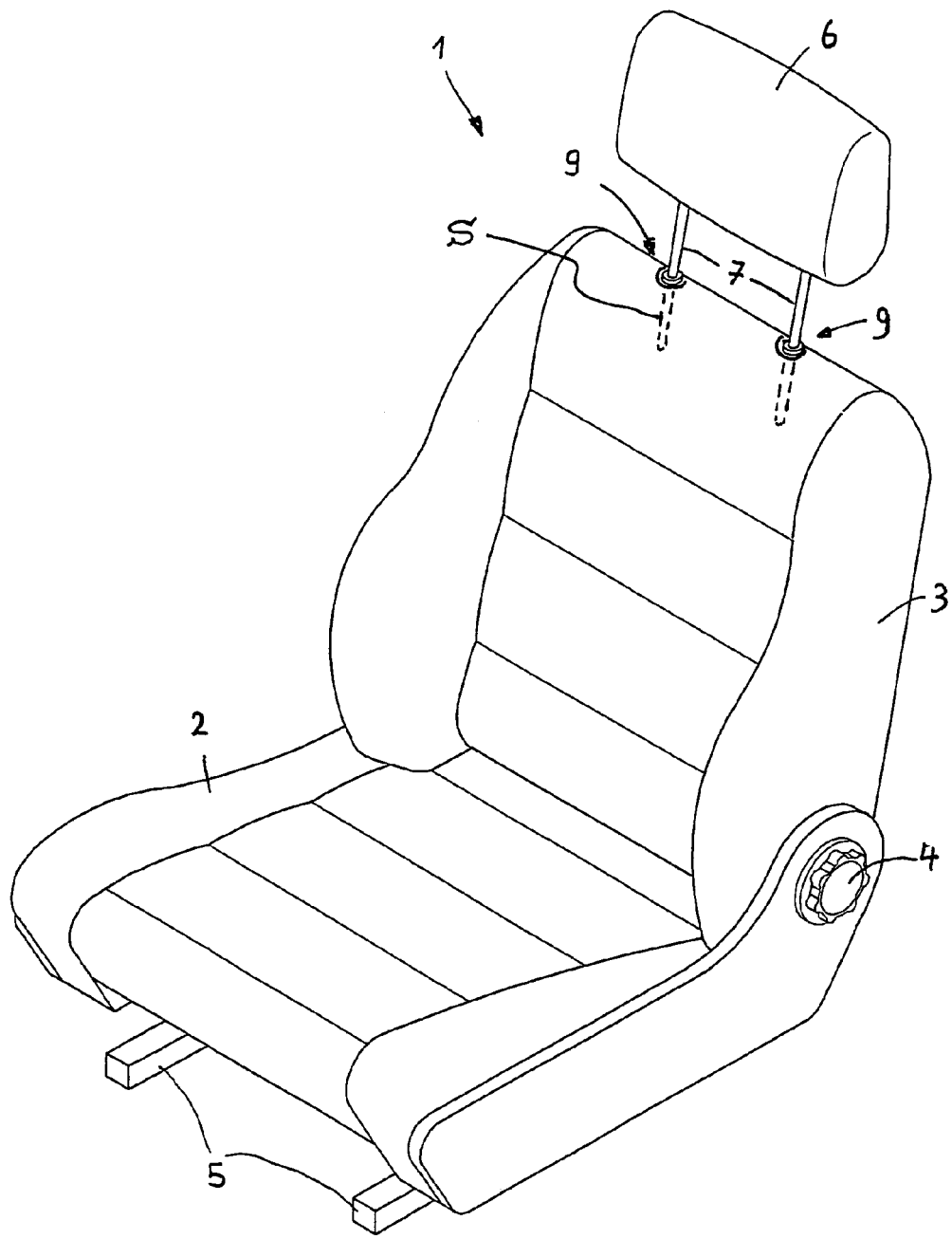
FIG. 1 is a schematic, perspective frontal view of a motor vehicle seat with a headrest mounted on its backrest.
Figure 2:
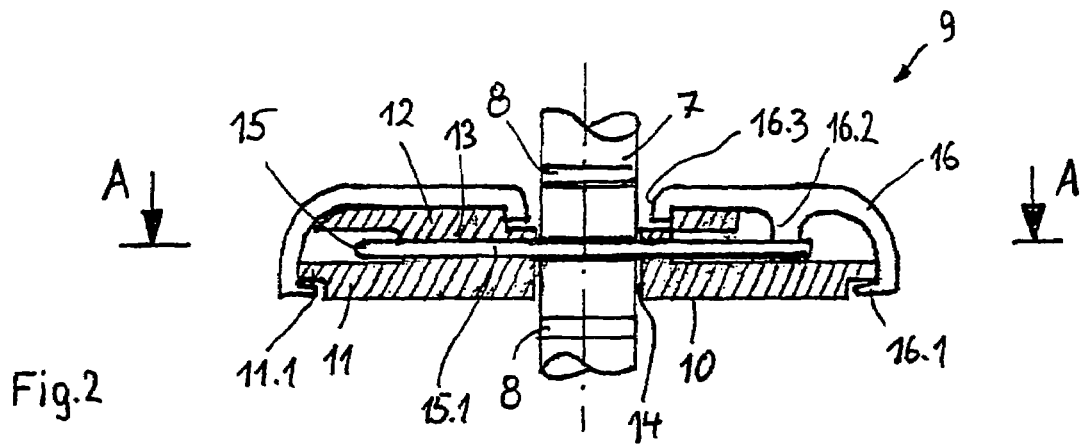
FIG. 2 is a cross section of the headrest locking mechanism of the motor vehicle seat.

A vehicle seat, such as a motor vehicle seat 1, as illustrated in FIG. 1 features a seat portion 2 and a backrest 3 mounted thereupon which can be adjusted in pitch. The pitch or inclination of the backrest 3 is adjusted by use of a control, such as a knob 4 found at the side of the motor vehicle seat 1. The motor vehicle seat 1 is longitudinally adjustable relative to a motor vehicle floor (not illustrated) on a track system 5. The backrest 3 includes a headrest 6 the height of which can be adjusted by means of two retaining rods 7 fitting into nonreclining sleeves S. To facilitate the height adjustment of the headrest 6, the lower portion of these retaining rods 7 features arresting notches 8 (FIG. 2) spaced apart from one another. The headrest 6 can be set at any height by means of a locking mechanism 9 found on the upper surface of the backrest. The construction thereof is described below with reference made to FIGS. 2 through 4.

The locking mechanism 9 shown in these figures features a base 10 which is nonrotably secured to the backrest 3. It consists of a base portion 11 and a covering portion 12 spaced apart from one another. The base portion 11 and covering portion 12 are connected via a central pillar or column 13 to form one piece. To fit the retaining rod 7 of the headrest 6 and allow it to be axially displaceable, the base 10 includes a central opening 14 in the region of column 13. The column 13 is shown having a straight wall 13.1 and a curved wall 13.2 on opposite sides. When the base 10 is assembled the straight wall 13.1 is situated in such a way that it closes somewhat tightly with the base 8.1 of the arresting notches 8 of the retaining rod 7, as FIG. 4 best illustrates. The curved wall 13.2 runs in the area of the opening 14 somewhat concentric to the wall and at one end runs together with the straight wall 13.1, forming a tail-like projection 13.3 in cross section.

The locking mechanism 9 also features a spring 15, such as a leg spring, with an arresting arm 15.1 and a retaining arm 15.2. Arresting arm 15.1 and retaining arm 15.2 are configured to be mated with walls 13.1 and 13.2 and column 13 listed above; that is, the arresting arm 15.1 is straight, while the retaining arm 15.2 is bent accordingly.

In the assembly of the locking mechanism 9 the spring 15 is inserted from the side of the projection 13.3 onto column 13 in the space formed between the base portion 11 and the covering portion 12 of the base 10. The arresting arm 15.1 and the retaining arm 15.2 are biased thereby, owing to the bulge on the column 13 near the opening 14, so that in the assembled spring 15 the arms are biased against opposed walls 13.1 and 13.2 of column 13. The insertion of spring 15 on the column 13 is thereby simplified as a result of the forward end of the retaining arm 15.2 being bent outwardly and with a curvature.

The assembly of the locking mechanism 9 is completed when a cover ring 16 is placed from above onto the base 10 and engaged therewith. To make this possible, the outer circumference of the cover ring 16 includes an inwardly bent lip 16.1 of an elastic material. The base portion 11 of the base 10 features a corresponding lip 11.1. In the assembled state cover ring 16 and base 10 engage one another with their engaging lips 16.1 and 11.1, whereby this connection is configured to allow the cover ring 16 to be rotated on the base 10. The cover ring 16 features two spaced apart engaging fingers 16.2, both of which are disposed at the free end of the arresting arm 15.1 as well as a central opening 16.3 provided concentrically relative to the opening 14 of the base 10.

Following the very simple assembly of the locking mechanism 9, headrest rod 7, which is frustum-shaped at its lower end, must still then only be inserted from above through the respective openings 16.3 and 14 of the cover ring 16 and the base 10. The chamfer at the end of the headrest rod 7 thereby presses both sides of the arresting arm 15.1. This then slides on the outside of the headrest rod 7 and falls into the next arresting notch 8.

Figure 3:
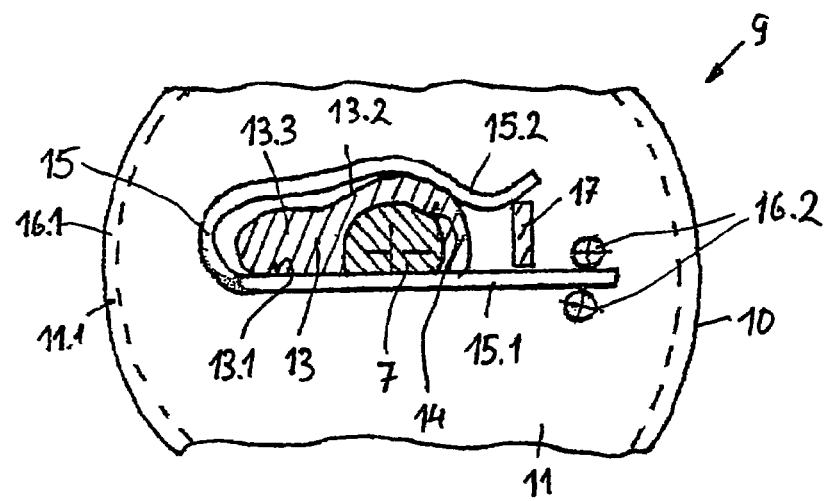
FIG. 3 is a section A—A of a headrest as illustrated in FIG. 2 in a locked position.

When the headrest 6 is locked into position the arresting arm 15.1 rests in one of the arresting notches 8 of the retaining rod 7 of the headrest 6 as is illustrated in FIG. 3. The arresting notches 8 feature flanks projecting perpendicularly from their respective bases 8.1 so that the arresting arm 15.1 cannot be pressed out of the arresting notch 8 if axial pressure or tension is applied to the retaining rod 7. To release the locking mechanism, the cover ring 16 is turned clockwise on the base 10. As a result, the engaging finger 16.2 engages the arresting arm 15.1 of the spring 15 and pivots it out of the arresting notch 8 in which it was engaged.

Figure 4:
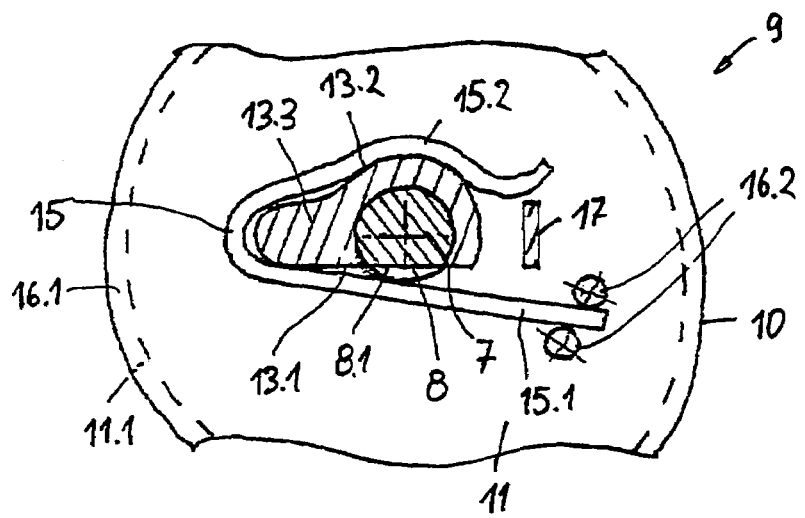
FIG. 4 is headrest as illustrated in FIG. 3 in an unlocked position.

This is illustrated in FIG. 4. Headrest height can now be adjusted. The arresting arm 15.1 then automatically falls into the next arresting notch 8 when the cover ring 16 is disengaged. Between the free ends of the arresting arm 15.1 and the retaining arm 15.2 is a stop 17 which is fixed to the base. This component prevents a possible rotation of the retaining arm 15.2 on the column 13, whenever the arresting arm 15.1 is pivoted into its unlocked position. At the same time this component can also serve to secure the arresting of the free end of the arresting arm 15.1 in its locked position.

The locking mechanism 9 described above may be provided on only one of the retaining rods 7 of the headrest 6. The locking mechanism 9' of the other retaining rod 7 can be of the same construction with the only difference being that an active unlocking through the twisting of the cover ring 16 is not possible. This feature is achieved as a result of the arresting notches 8 of retaining rod 7 found on this locking mechanism 9' not having perpendicular or straight flanks, but instead having oblique flanks. When axial pressure or tension is applied to this retaining rod 7, the oblique flanks of their arresting notches 8 engage the arresting arm 15.1 of the spring 15, whereby the latter is automatically pressed outward into its unlocked position.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Vehicle seat, comprising:
   a) a headrest mounted on a backrest of the vehicle seat;
   b) a retaining rod provided by which the headrest height can be adjusted;
   c) a sleeve fixed on the backrest;
   d) the retaining rod fitting into the sleeve;
   e) an arresting device provided for arresting the retaining rod, the arresting device including arresting notches on a lower portion of the retaining rod, and the arresting device including a spring with a retaining foot and an arresting foot, and which is mounted on a nonreclining base fixed relative to a top surface of the backrest, the spring abutting the base with its retaining foot and, in a locked position, engaging one of the arresting notches of the retaining rod with its arresting foot as a result of spring tension;
   f) a manual control element being provided, the manual control element including a cover ring;
   g) the cover ring being engageable with a base and twisted thereupon, and the cover ring including an engaging finger for engaging the arresting foot of the spring; and
   h) to facilitate the unlocking of the retaining rod from its locked position, the arresting foot being pivotable against the tension of the spring and out of engagement with a respective one of the arresting notches by use of the manual control element.

2. Vehicle seat as in claim 1, wherein:
   a) the base is an integral head of the sleeve.

3. Vehicle seat as in claim 1, wherein:
a) the base includes a base portion and a covering portion, which are connected via a central column to form one piece on which the spring is inserted.

4. Vehicle seat as in claim 3, wherein:
a) the arresting foot, the retaining foot, and the column are configured in such a way that, when inserted, the spring is engaged with the column as a result of spring tension.

5. Vehicle seat as in claim 4, wherein:
a) between respective free ends of the arresting foot and the retaining foot is a stop fixed to the base.

6. Vehicle seat as in claim 3, wherein:
a) between respective free ends of the arresting foot and the retaining foot is a stop fixed to the base.

7. Vehicle seat as in claim 1, wherein:
a) between respective free ends of the arresting foot and the retaining foot is a stop fixed to the base.

8. Vehicle seat as in claim 1, wherein:
a) the base includes a base portion and a covering portion, which are connected via a central column to form one piece on which the spring is engaged.

9. Vehicle seat as in claim 8, wherein:
a) the arresting foot, the retaining foot, and the column are configured in such a way that the spring is engaged with the column as a result of spring tension.

\* \* \* \* \*